(12) United States Patent
Sonoda

(10) Patent No.: US 10,091,469 B2
(45) Date of Patent: Oct. 2, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tetsuri Sonoda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 368 days.

(21) Appl. No.: 14/861,998

(22) Filed: Sep. 22, 2015

(65) Prior Publication Data

US 2016/0086335 A1  Mar. 24, 2016

(30) Foreign Application Priority Data

Sep. 24, 2014 (JP) ................................ 2014-194346

(51) Int. Cl.
*H04N 5/232* (2006.01)
*H04N 9/31* (2006.01)
*G06T 7/521* (2017.01)

(52) U.S. Cl.
CPC ............... *H04N 9/31* (2013.01); *G06T 7/521* (2017.01)

(58) Field of Classification Search
None
See application file for complete search history.

(56) References Cited

U.S. PATENT DOCUMENTS

| 4,947,243 A | * | 8/1990 | Wendland | H04N 9/646 348/609 |
| 8,031,909 B2 | * | 10/2011 | Se | G01C 11/06 382/106 |

(Continued)

FOREIGN PATENT DOCUMENTS

| JP | 2714152 B2 | 2/1998 |
| JP | 2005-172622 A | 6/2005 |

(Continued)

OTHER PUBLICATIONS

Dense One-shot 3D Reconstruction by Detecting Continuous Regions with Parallel Line Projection, Sagawa et al., 2011 International Conference for Computer Vision.*

*Primary Examiner* — Janese Duley
(74) *Attorney, Agent, or Firm* — Canon U.S.A., Inc. IP Division

(57) ABSTRACT

An image processing apparatus can measure a three-dimensional shape of a subject with high accuracy when an image of a projection pattern is captured with a favorable contrast. The image processing apparatus includes a matching calculation unit that performs matching calculation between a projection pattern in an image being captured and an image of a projection pattern generated by a projection pattern generation unit. An image evaluation unit calculates a contrast as an evaluation standard in the captured image. A symbol position calculation unit highly accurately calculates a position of each of a group of points forming the projection pattern, for each area in the captured image determined to be a highly accurate shape measurable area based on the contrast, and thus obtains a peak luminance position. A three-dimensional shape calculation unit calculates the three-dimensional shape of the subject.

13 Claims, 13 Drawing Sheets

(56) References Cited

U.S. PATENT DOCUMENTS

| | | | | |
|---|---|---|---|---|
| 2003/0066949 A1* | 4/2003 | Mueller | ............. | G01B 11/00 250/208.1 |
| 2007/0090189 A1* | 4/2007 | Suwa | ............. | G01B 11/2522 235/454 |
| 2013/0301909 A1* | 11/2013 | Sato | ............. | G01B 11/25 382/154 |
| 2014/0313196 A1* | 10/2014 | Mistretta | ............. | A61B 6/032 345/424 |
| 2017/0102224 A1* | 4/2017 | Bridges | ............. | G01B 11/005 |

FOREIGN PATENT DOCUMENTS

| | | |
|---|---|---|
| JP | 2013-024647 A | 2/2013 |
| JP | 2014-035294 A | 2/2014 |

\* cited by examiner

FIG. 7

| 1 | 0 | -1 |
|---|---|----|
| 2 | 0 | -2 |
| 1 | 0 | -1 |

IMAGE PROCESSING APPARATUS, IMAGE PROCESSING METHOD, AND STORAGE MEDIUM

CROSS REFERENCES TO RELATED APPLICATIONS

The present application claims the benefit of priority from Japanese Patent Application No. 2014-194346 filed Sep. 24, 2014, which is hereby incorporated by reference herein in its entirety.

BACKGROUND OF THE INVENTION

Field of the Invention

The present disclosure generally relates to image processing and, more particularly, to an image processing apparatus, an image processing method, and a storage medium that are suitably used for measuring a three-dimensional shape of a subject.

Description of the Related Art

Conventionally, a method is known in which a predetermined pattern is projected onto a subject, an image of the subject is captured, and a distortion of the predetermined pattern is calculated, whereby a three-dimensional shape of the subject and a surface distortion are obtained. More specifically, in a widely known method, the three-dimensional shape of the subject or a level of the surface deformation can be measured by capturing an image of the subject on which a random pattern is projected, and calculating, based on the captured image, a local displacement amount in the pattern projected on the subject through correlation calculation. As the correlation calculation in such a method, window matching between a projected random pattern generated by laser speckle and each partial area cut out from the captured image as described in Japanese Patent No. 2714152 is performed, for example.

However, the calculation in the window matching described above requires an area of a predetermined size or larger. The window matching is performed on the premise that all the points in the cutout partial area have the same displacement amount, that is, the same depth. Thus, a depth is calculated at an arbitrary point, being averaged with depths at surrounding points. This means that even in a case where, for example, an image of the projection pattern is captured with a favorable contrast, the depths are averaged, and thus measurement with high accuracy which is expected in this condition cannot be achieved.

SUMMARY OF THE INVENTION

An image processing apparatus according to an aspect of the present disclosure includes a first calculation unit configured to calculate, by window matching, a corresponding position between a projection pattern projected by a projection unit, in which a plurality of symbols having a luminance peak is arranged, and a projection pattern in a captured image including a subject onto which the projection pattern is projected by the projection unit, a second calculation unit configured to calculate a position of the luminance peak in the captured image, based on the position of a symbol in a projection pattern based on a calculation result obtained by the first calculation unit, and a measurement unit configured to measure a three-dimensional shape of the subject based on the position of the luminance peak calculated by the second calculation unit.

According to the present disclosure, when an image of the projection pattern is captured with a favorable contrast, the three-dimensional shape of the subject can be measured with high accuracy.

Further features of the present disclosure will become apparent from the following description of exemplary embodiments with reference to the attached drawings.

BRIEF DESCRIPTION OF THE DRAWINGS

FIG. 7 is a diagram for describing an example of a Sobel filter.

DESCRIPTION OF THE EMBODIMENTS

A first exemplary embodiment is described below. In the present exemplary embodiment, a specific exemplary embodiment for improving deterioration of measurement accuracy in window matching is described.

In conventional window matching, the measurement results are averaged in accordance with a size of a window used for the correlation calculation regardless of the condition of capturing an image of a subject. In the present exemplary embodiment, the captured image is evaluated, and a matching position is recalculated for each of the points forming a projection pattern in an area determined as a highly accurate shape measurable area. Thus, highly accurate measurement can be achieved without averaging in accordance with the size of the window. The present exemplary embodiment is described in detail below.

Figure 1:
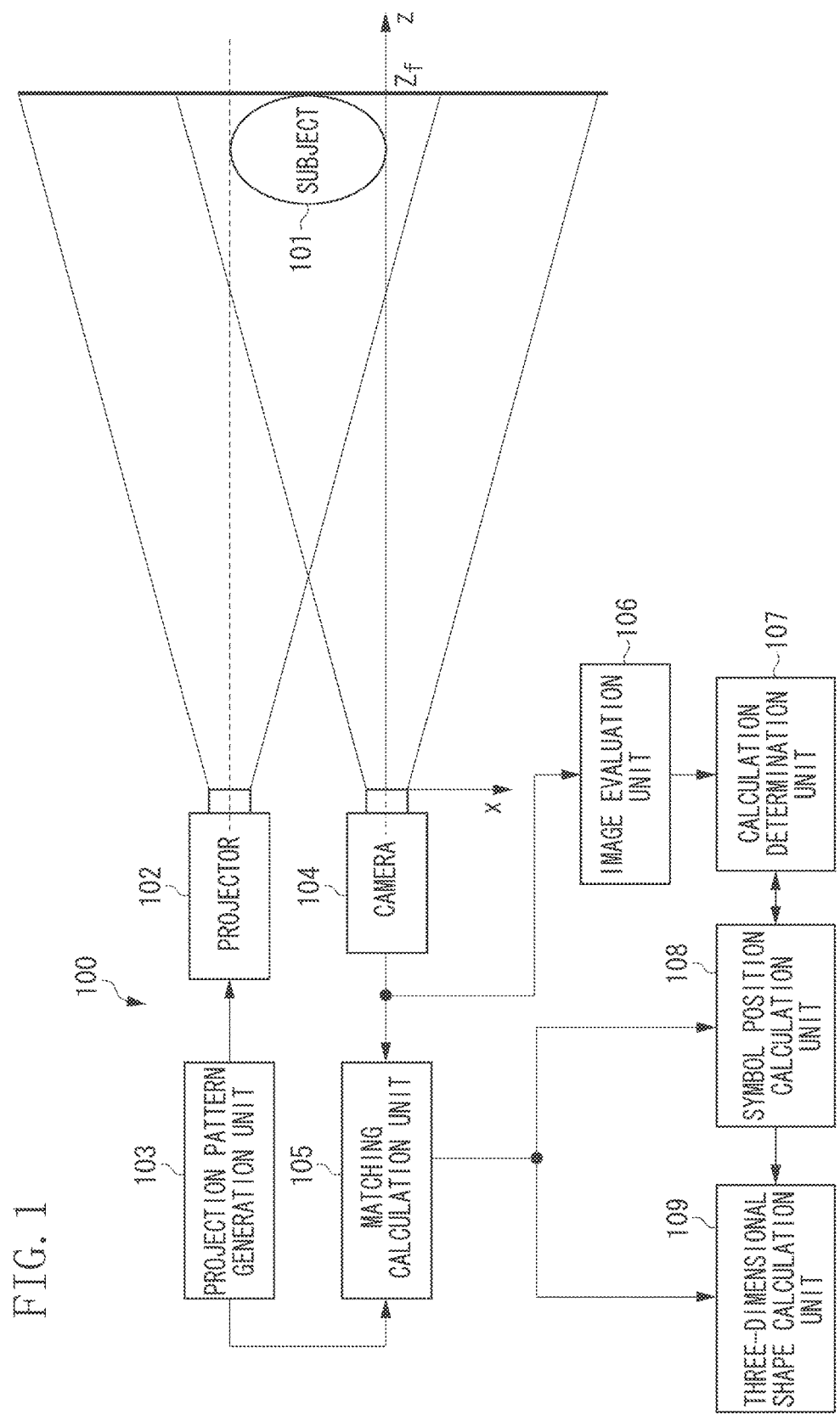
FIG. 1 is a block diagram illustrating an entire configuration example of an image processing apparatus according to a first exemplary embodiment.
Figure 2:
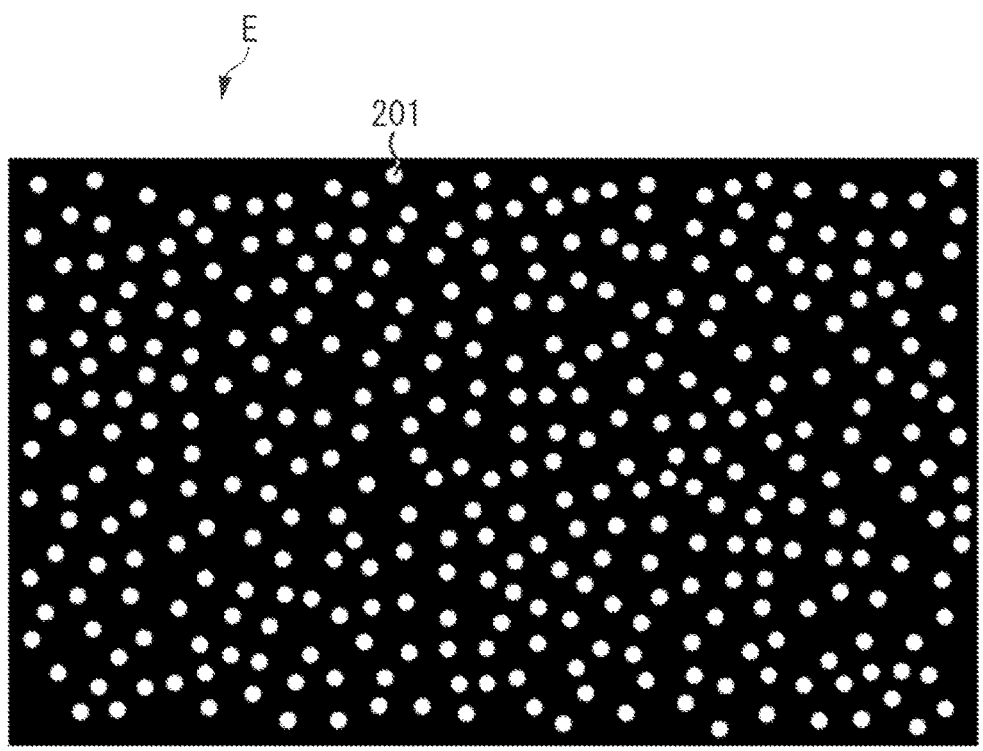
FIG. 2 is a diagram illustrating an example of a projection pattern according to an exemplary embodiment.

FIG. 1 is a block diagram illustrating an entire configuration example of an image processing apparatus 100 according to the present exemplary embodiment that measures a three-dimensional shape of a subject 101. An example of control performed for measuring the three-dimensional shape using a projection pattern E illustrated in FIG. 2 is described below.

In FIG. 1, a projector 102 serves as a projection unit that projects a projection pattern, generated by a projection pattern generation unit 103 described below, onto the subject 101 as a measurement target. The projection pattern generation unit 103 generates the projection pattern E illustrated in FIG. 2 as image data. As used herein, the term "unit" generally refers to any combination of software, firmware, hardware, or other component, such as circuitry, that is used to effectuate a purpose.

A camera 104 serves as an image capturing unit that obtains a captured image C of the subject 101 on which the projection pattern E is projected. A matching calculation unit 105 obtains a matching image D by performing matching calculation between the projection pattern E projected on the subject 101 in the captured image C, and the image of the projection pattern E generated by the projection pattern generation unit 103.

An image evaluation unit 106 evaluates the captured image C through processing described below, and obtains an evaluation standard for determining whether highly accurate measurement can be performed for each area in the captured image C. In the present exemplary embodiment, a contrast image J is obtained by the calculation as an evaluation standard. A calculation determination unit 107 determines whether highly accurate shape measurement can be performed for each symbol in the projection pattern E, based on the evaluation standard obtained by the image evaluation unit 106.

A symbol position calculation unit 108 highly accurately calculates a position of each of a group of points forming the projection pattern E, for each area in the captured image C determined to be the highly accurate shape measurable area by the calculation determination unit 107, and thus obtains a symbol position U. A three-dimensional shape calculation unit 109 calculates a depth, that is, a three-dimensional shape S of the subject monitored with the camera 104, by using the matching image D, the symbol position U, and a positional relationship between the projector 102 and the camera 104 described below.

Figure 3:
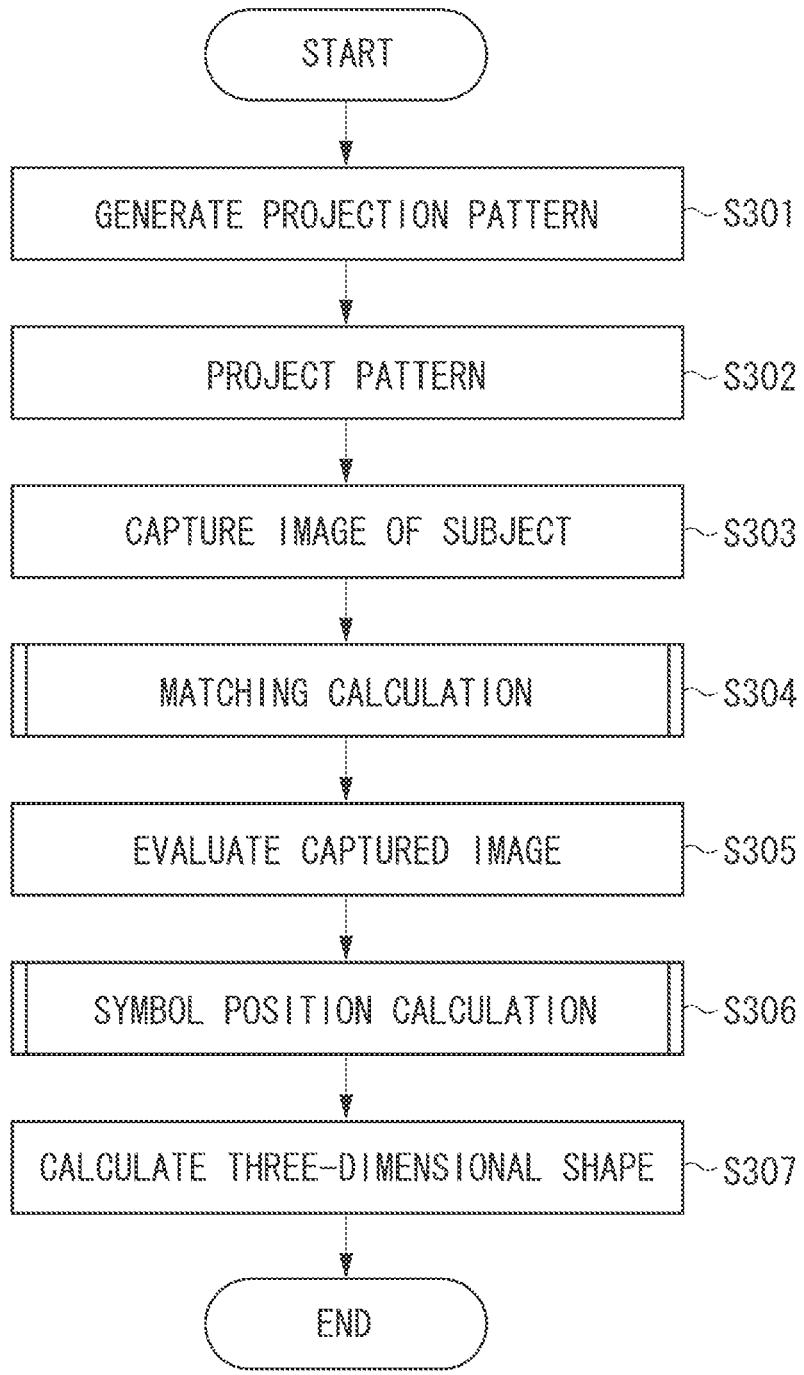
FIG. 3 is a flowchart illustrating an example of an overall processing for measuring a three-dimensional shape of a subject.

FIG. 3 is a flowchart illustrating an example of an overall processing for measuring the three-dimensional shape of the subject according to the present exemplary embodiment. The processing is described below with reference to the flowchart in FIG. 3.

Figure 4:
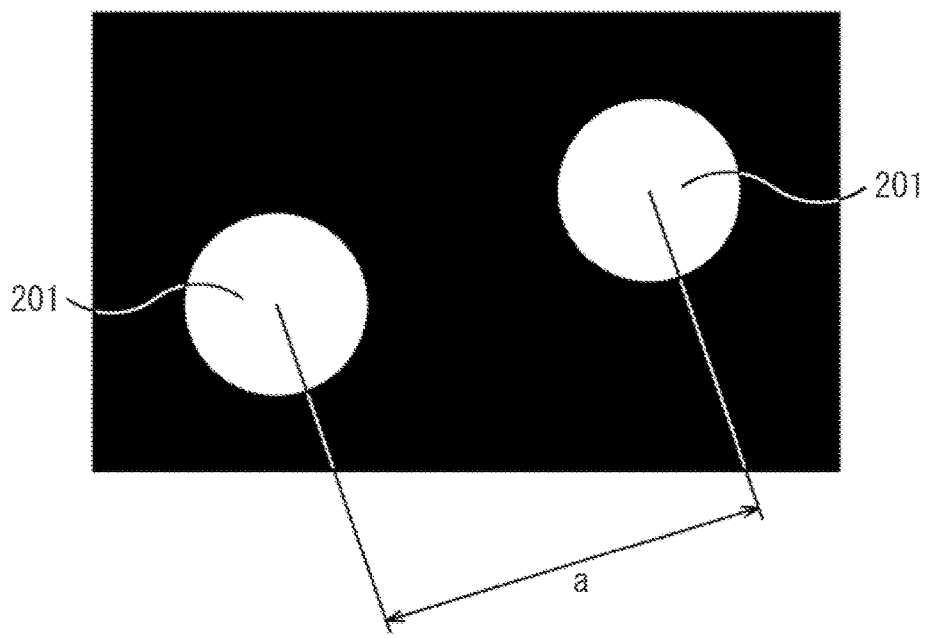
FIG. 4 is a partially enlarged view of the projection pattern according to the exemplary embodiment.

First of all, in step S301, the projection pattern generation unit 103 generates, for example, the projection pattern E illustrated in FIG. 2 as an image with a resolution ($n_x$, $n_y$). The projection pattern E includes a group of points e ($e_x$, $e_y$) as symbols that are separated from each other by a predetermined distance or longer and thus do not overlap with each other. More specifically, as illustrated in FIG. 4, the points 201 are separated from each other by a symbol distance a set to be longer than a symbol distance threshold $a_{th}$. Thus, the position of each point 201 can be calculated even when the projection pattern E blurs because the subject 101 shifts from a focal plane of the projector 102. The points 201 are arranged with a mutually random positional relationship so that correct matching can be achieved with a window matching calculation described below. The point 201 has a high autocorrelation peak in a partial area in the projection pattern E and a low cross correlation with other partial areas.

In step S302, the projector 102 projects the projection pattern E generated in step S301 onto the subject 101.

In step S303, the camera 104 captures an image of the subject 101 on which the projection pattern E is projected, and thus obtains the captured image C. In the present exemplary embodiment, to simplify the processing, it is assumed that the angle of view is the same in the projector 102 and the camera 104, and the resolution ($n_x$, $n_y$) in xy directions is the same in the projection pattern E and the captured image C. Furthermore, it is assumed that the projector 102 and the camera 104 are disposed with their optical axes in parallel with each other.

In step S304, the matching calculation unit 105 executes the matching calculation by using the captured image C obtained in step S303 and the projection pattern E obtained in step S301. Thus, the matching image D is acquired as a set of parallaxes d calculated for respective pixels in the captured image C. The processing in step S304 is described in detail below.

In step S305, the image evaluation unit 106 evaluates the captured image C. Thus, a contrast image J is acquired as an evaluation result. The contrast j at a given pixel p is represented by the following Formula (1).

$$j = \frac{I_{pmax} - I_{pmin}}{I_{pmax} + I_{pmin}} \quad (1)$$

In Formula (1), $I_{pmax}$ and $I_{pmin}$, respectively, represent a pixel value with the highest luminance and a pixel value with the lowest luminance in a rectangular area including the pixel p and upper, lower, right and left pixels adjacent to the pixel p in the captured image C. The contrast image J is acquired by calculating the contrast j for each pixel in the captured image C. A larger contrast j indicates that an image is captured in which the center of each of the points forming the projection pattern E projected onto the subject 101 is brighter and areas that do not include the points are darker. When the projection pattern E is projected which includes sufficiently bright points and is clearly imaged without blurring, it can be determined that a condition for highly accurately detecting the position of each of a group of points, is satisfied.

In step S306, the symbol position calculation unit 108 calculates the symbol position U by using the captured image C and an image of the projection pattern E, and the matching image D acquired in step S304. The symbol position U is a set of luminance peak values u of the group of points forming the projection pattern E. The processing in step S306 is described in detail below.

Figure 8:
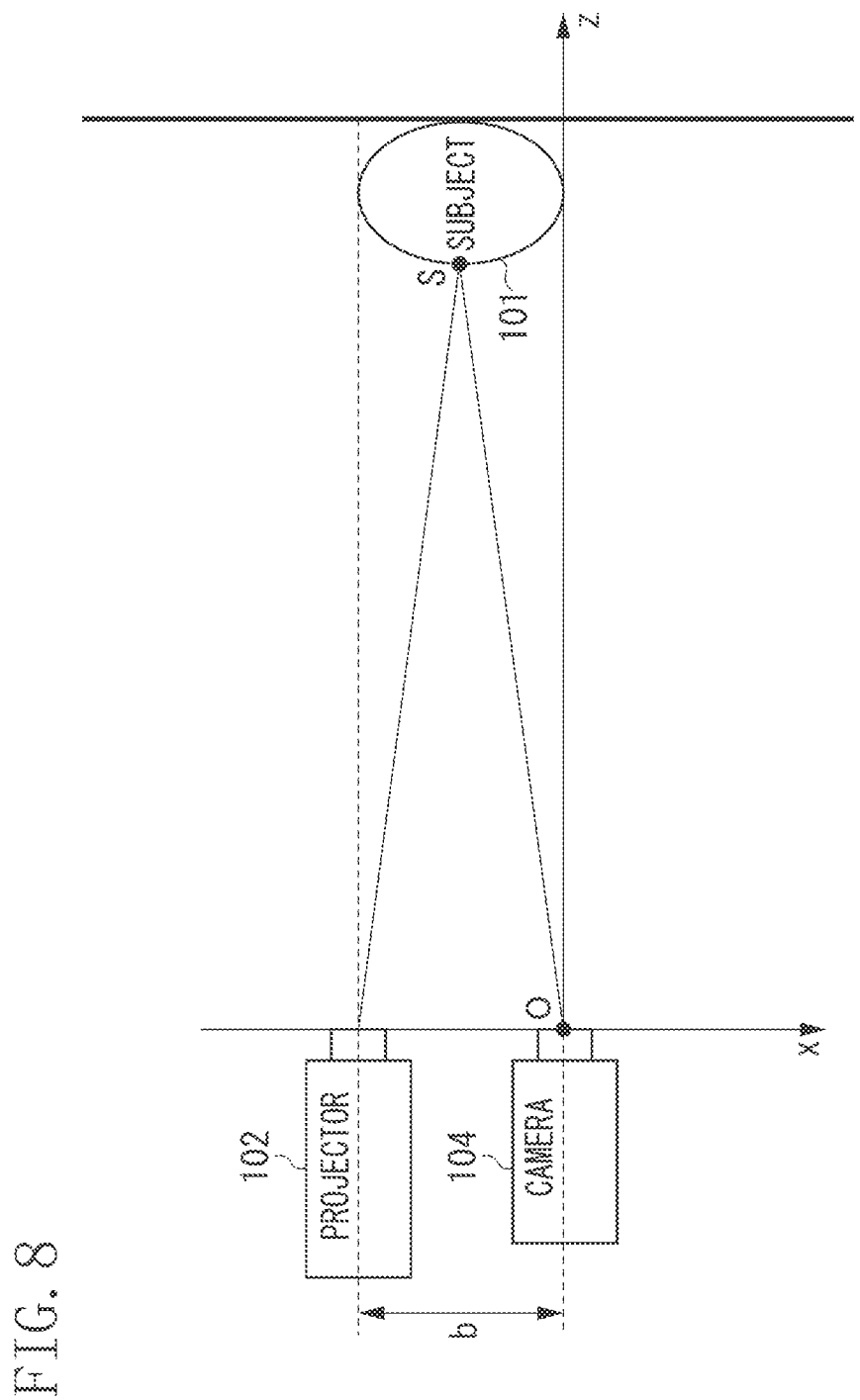
FIG. 8 is a diagram for describing a positional relationship among a projector, a camera, and a subject.

In step S307, the three-dimensional shape calculation unit 109 calculates the three-dimensional shape of the subject 101 using the symbol position U acquired in step S306. FIG. 8 is a schematic view of a simplified positional relationship among the projector 102, the camera 104, and the subject 101. Here, a spatial coordinate system for representing the result of the three dimensional measurement, is defined in the x and y directions that are the same as those in the captured image C as well as a z direction representing the depth. The z direction is set to extend in the optical axis direction from an origin O at the principal point of the camera 104.

A case is considered where the subject 101 is observed with the camera 104 at a given point s ($x_s$, $y_s$, $z_s$) in the spatial coordinate system. Assuming that the point s is observed at the luminance peak position u ($x_u$, $y_u$) on the captured image C, the spatial coordinates of the point s are represented by the following Formula (2).

$$\begin{cases} x_s = k x_u / f \\ y_s = k y_u / f \\ z_s = k / f \end{cases} \quad (2)$$

In Formula (2), f represents the focal length of the projector 102 and the camera 104 in a pixel unit, and k is a parameter of a predetermined value. Here, when the coordinates of the point s on the projection pattern E projected by the projector 102 are $s_p$ ($x_{sp}$, $y_{sp}$), $y_u = y_{sp}$ holds true and the parallax d acquired in step S304 is a difference between $x_u$ and $x_{sp}$. Thus, a depth $z_s$ of the point s is represented in the following Formula (3) with a parallax $d_u$ corresponding to the luminance peak position u.

$$z_s = b \cdot f / d_u \quad (3)$$

As illustrated in FIG. 8, b represents a base-line length for determining the positional relationship between the projector 102 and the camera 104. Three-dimensional coordinates ($x_s$, $y_s$, $z_s$) of the point s can be obtained from the following Formula (4) by deleting the parameter k using Formulae (2) and (3).

$$\begin{cases} x_u = x_u \cdot b \cdot f / d_u \\ y_s = y_u \cdot b \cdot f / d_u \\ z_s = b \cdot f / d_u \end{cases} \quad (4)$$

By thus calculating the three-dimensional spatial coordinates of the point s for each of the luminance peak positions u calculated in step S306, the three-dimensional shape S of the subject 101 as the set of the points s can be obtained.

Figure 5:
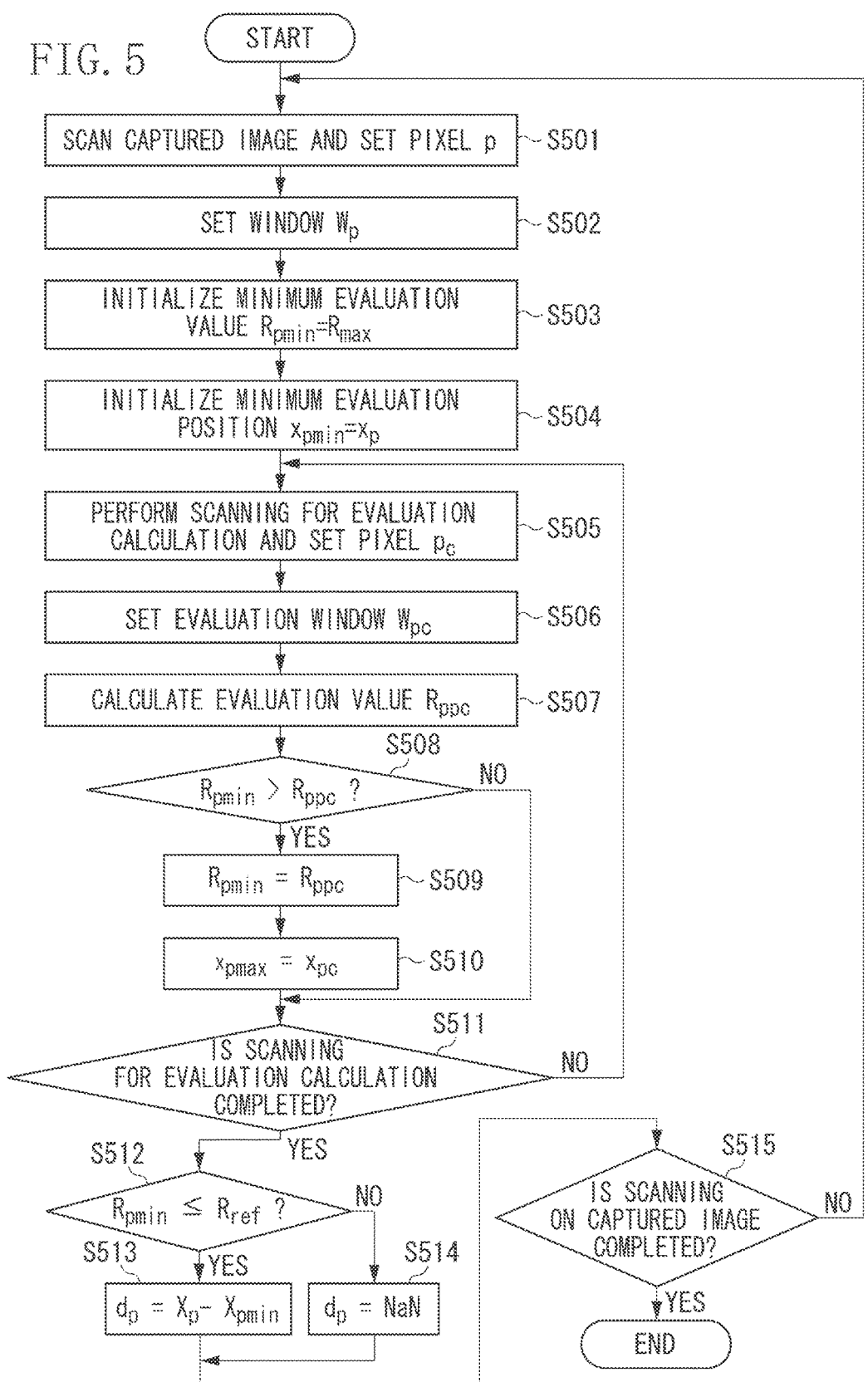
FIG. 5 is a flowchart illustrating an example of processing for acquiring a matching image according to the exemplary embodiment in detail.

Now, the processing in step S304 is described in detail below. FIG. 5 is a flowchart illustrating an example of the processing executed by the matching calculation unit 105 in step S304 in detail.

In step S501, the matching calculation unit 105 performs scanning on the captured image C, and sets a pixel p with which the matching calculation is to be performed.

Then, in step S502, the matching calculation unit 105 sets a rectangular area m including the pixel p set in step S501 and the upper, lower, right and left pixels adjacent to the pixel p in the captured image C as a captured image window $W_p$ used for the evaluation calculation. The luminance is 0 at a portion of the rectangular area m outside the captured image C.

In step S503, the matching calculation unit 105 initializes the minimum evaluation value $R_{pmin}$ corresponding to the pixel p with the maximum evaluation value $R_{max}$ as the largest possible value.

In step S504, the matching calculation unit 105 initializes a minimum evaluation position $x_{pmin}$ indicating a position where the minimum evaluation value is obtained, with $x_p$ indicating a position of the pixel p in the captured image C.

In step S505, the matching calculation unit 105 scans the captured image window $W_p$ and the projection pattern E as the target of the evaluation calculation, and sets a pixel $p_c$. The pixel $p_c$ is a candidate of a pixel on the image of the projection pattern E which corresponds to the pixel p, in the captured image C set in step S501. Based on the positional relationship between the projector 102 and the camera 104, the pixel $p_c$ is only obtained on a y coordinate $y_{pc}$ on the projection pattern which corresponds to a y coordinate $y_p$ of the pixel p. Thus, the scanning is performed on the coordinate $y_{pc}$. The correspondence relationship between $y_p$ and $y_{pc}$ is measured in advance and is stored in a table.

In step S506, the matching calculation unit 105 sets a rectangular area m including the pixel $p_c$ and upper, lower, right and left pixels adjacent to the pixel $p_c$ on the projection pattern E set in step S505, as a projection pattern window $W_{pc}$ used for the evaluation calculation. The luminance 0 is applied to a portion of the rectangular area m outside the captured image C.

In step S507, the matching calculation unit 105 calculates an evaluation value $R_{ppc}$ between the captured image window $W_p$ set in step S502 and the projection pattern window $W_{pc}$ set in step S506 using the following Formula (5).

$$R_{ppc} = \sum_{x_w} (I_{wp}(x_w) - I_{wpc}(x_w))^2 \quad (5)$$

In the formula, $x_w$ represents a relative position where each pixel is scanned in the captured image window $W_p$ and the projection pattern window $W_{pc}$ having the same shape. $I_{wp}(x_w)$ represents a luminance value at the relative position $x_w$ in the captured image window $W_p$, and $I_{wpc}(x_w)$ represents the luminance value at the relative position $x_w$ in the projection pattern window $W_{pc}$. The smaller an evaluation value $R_{ppc}$, the higher a degree of similarity between the captured image window $W_p$ and the projection pattern window $W_{pc}$. Thus, the pixel $p_c$ in the projection pattern E with the smallest evaluation value $R_{ppc}$ is regarded as the pixel corresponding to the pixel p in the captured image C.

In step S508, the matching calculation unit 105 compares the minimum evaluation value $R_{pmin}$ with the evaluation value $R_{ppc}$. When the result of the comparison indicates that the evaluation value $R_{ppc}$ is smaller (Yes in S508), the processing proceeds to step S509. On the other hand, when the evaluation value $R_{ppc}$ is not smaller (No in S508), the processing proceeds to step S511.

In step S509, the matching calculation unit 105 substitutes the evaluation value $R_{ppc}$ into the minimum evaluation value $R_{pmin}$.

In step S510, the matching calculation unit 105 substitutes $x_{pc}$ as the pixel position in the current evaluation calculation into the minimum evaluation position $x_{pmin}$.

In step S511, the matching calculation unit 105 determines whether the scanning is completed, that is, whether all the pixels on the coordinate $y_{pc}$ in the projection pattern E have been set as the pixel $p_c$. When it is determined that the scanning is completed (Yes in S511), the processing proceeds to step S512. On the other hand, when it is determined that the scanning has not been completed (No in S511), the processing returns to step S505.

In step S512, the matching calculation unit 105 determines whether the minimum evaluation value $R_{pmin}$ is equal to or smaller than a reference evaluation value $R_{ref}$. When it is determined that the minimum evaluation value $R_{pmin}$ is larger than the reference evaluation value $R_{ref}$ (No in S512), the similarity calculation result is determined to be unreliable, and then the processing proceeds to step S514. On the other hand, when it is determined that the minimum evaluation value $R_{pmin}$ is equal to or smaller than the reference evaluation value $R_{ref}$ (Yes in S512), the similarity calculation result is determined to be reliable, and then the processing proceeds to step S513.

In step S513, the matching calculation unit 105 obtains the parallax $d_p$ as the matching result at the pixel p. More specifically, a difference between the pixel position $x_p$ of the current pixel p and the minimum evaluation position $x_{pmin}$ as the position in the projection pattern E corresponding to the pixel $p_c$ is obtained.

In step S514, the matching calculation unit 105 substitutes NaN indicating that the value is invalid, to the parallax $d_p$ as the matching result at the pixel p. This parallax $d_p$ at the pixel p is determined to be invalid, and thus will not be used in the later calculation.

In step S515, the matching calculation unit 105 determines whether the scanning on the captured image C has been completed, that is, whether all the pixel positions $x_p$ in the captured image C have been set as the pixel p. When it is determined that the scanning has been completed (Yes in S515), the processing in step S304 is terminated. On the other hand, when the scanning has not been completed (No in S515), the processing returns to step S501.

Through the processing described above, the parallax $d_p$ at each pixel p can be obtained with the xy resolution $(n_x, n_y)$ that is the same as the captured image C. The set of parallaxes d obtained for the respective pixels is referred to as the matching image D.

Figure 6:
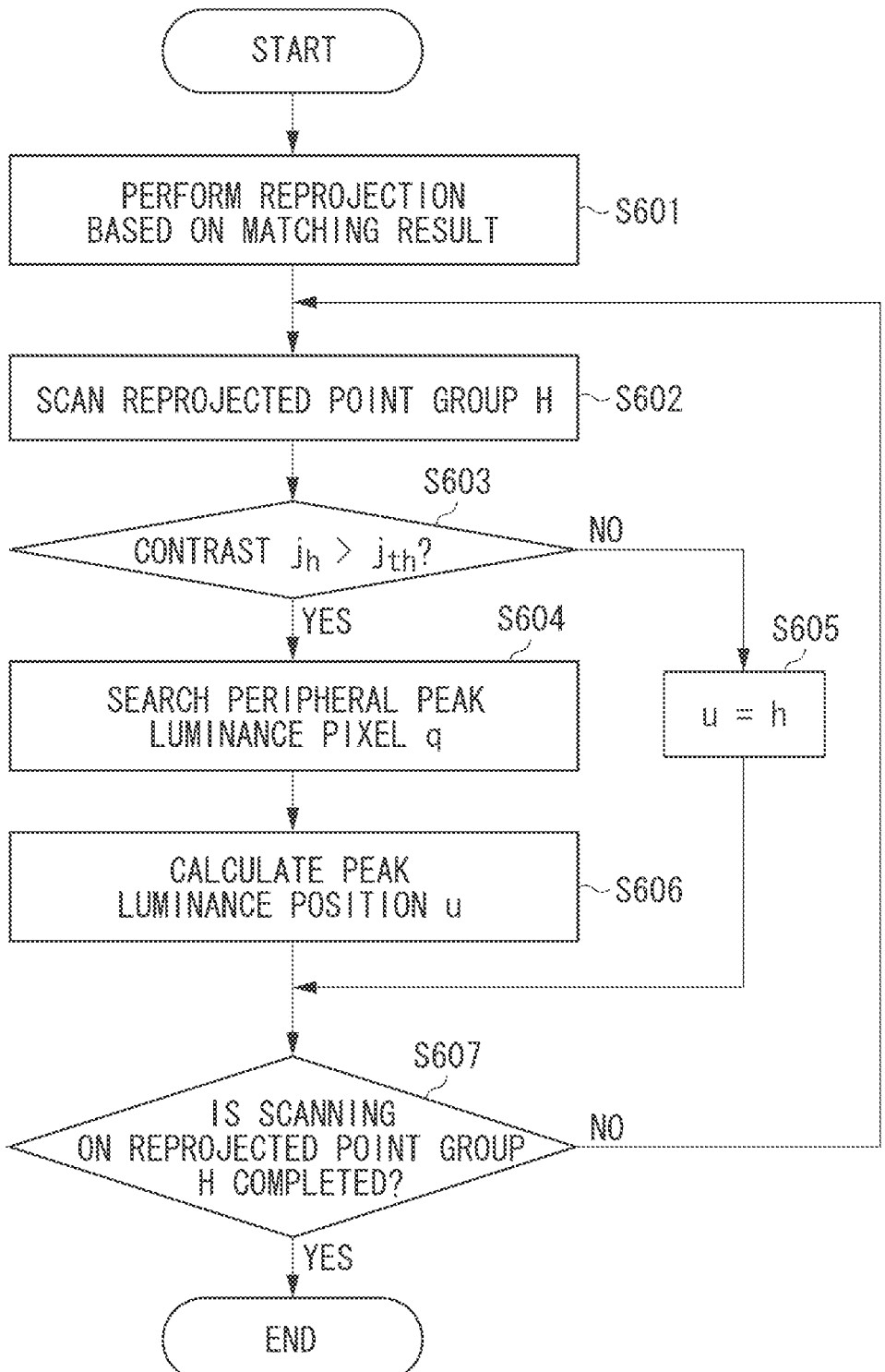
FIG. 6 is a flowchart illustrating an example of processing for calculating a symbol position of a group of points forming the projection pattern according to the first exemplary embodiment in detail.

Next, the processing in step S306 is described in detail below. FIG. 6 is a flowchart illustrating an example of processing in step S306 in detail.

In step S601, the symbol position calculation unit 108 performs reprojection by referring to the group of points forming the projection pattern E, based on the parallaxes $d_p$ in the matching image D obtained in step S304, and thus obtains a reprojected point group H. The relationship between a reprojected point h $(h_x, h_y)$ in the reprojected point group H and the corresponding point e $(e_x, e_y)$ in the projection pattern E is represented by the following Formula (6).

$$\begin{cases} h_x = e_x - d_h \\ h_y = e_y \end{cases} \quad (6)$$

In Formula (6), $d_h$ represents the parallax d at the position $(h_x, h_y)$ in the matching image D. The reprojection is not performed on the position where NaN is set to the parallax $d_h$. The reprojected point group H is obtained by performing the reprojection of all the points e in the projection pattern E except for the point where the parallax $d_h$ is NaN.

In step S602, the symbol position calculation unit 108 scans the reprojected point group H obtained in step S601, and sets the reprojected point $h(h_x, h_y)$ as a target of a symbol position calculation.

In step S603, the calculation determination unit 107 selects the calculation to be performed based on a contrast $j_h$ at a pixel position $(h_x, h_y)$ in the contrast image J obtained by the image evaluation unit 106. More specifically, whether the contrast $j_h$ is higher than a contrast threshold $j_{th}$ is determined. When it is determined that the contrast $j_h$ is higher than the contrast threshold $j_{th}$ (Yes in S603), the processing proceeds to step S604. On the other hand, when it is determined that the contrast $j_h$ is not higher than the contrast threshold $j_{th}$ (No in S603), the processing proceeds to step S605. The contrast threshold $j_{th}$ is experimentally obtained in advance as a threshold for determining whether the subsequent symbol position calculation can be performed with higher accuracy compared with the position of the reprojected point h. By the selection of the calculation in this step, the subsequent symbol position calculation is selectively performed only when a highly accurate measurement result is expected.

In step S604, the symbol position calculation unit 108 searches for a peripheral peak luminance pixel q $(q_x, q_y)$ showing the highest luminance in a rectangular area w including the pixel position $(h_x, h_y)$ and upper, lower, right and left pixels adjacent to the pixel position $(h_x, h_y)$ on the same captured image C as the reprojected point h. The value w indicating the range of the rectangular area is preferably smaller than the symbol distance threshold $a_{th}$ to prevent adjacent points from being erroneously detected. Through the search, the position of each group of projected points in the captured image C is detected in a pixel unit.

In step S605, the symbol position calculation unit 108 substitutes the coordinate position of the reprojected point h into the coordinate position of the luminance peak position u.

Figure 7:
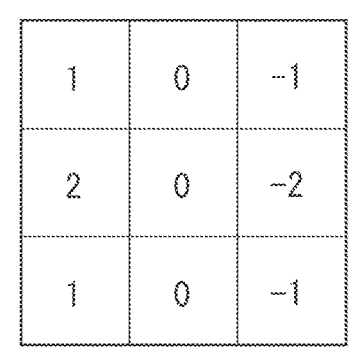

In step S606, the symbol position calculation unit 108 obtains a peak luminance position u $(u_x, u_y)$ in a subpixel unit with the adjacent peak luminance pixel q $(q_x, q_y)$ obtained in step S604 as a reference position. When a Sobel filter illustrated in FIG. 7 is used, the peak luminance positions $u_x$ and $u_y$ are represented in the following Formula (7), where $Z_q$ represents a Sobel filter value at a pixel position $(q_x, q_y)$ on the captured image C, $Z_{q-}$ represents a Sobel filter value at a pixel position $(q_x-1, q_y)$, and $Z_{q+}$ represents a Sobel filter value at a pixel position $(q_x+1, q_y)$.

$$\begin{cases} u_x = q_x + \dfrac{Z_{q-}}{Z_{q-} - Z_q}(Z_q \le 0) \\ u_x = q_x + \dfrac{Z_q}{Z_q - Z_{q+}}(Z_q > 0) \\ u_y = e_y \end{cases} \quad (7)$$

The position $u_y$ is the same as the position $e_y$ of the point e in the projection pattern E according to the positional relationship between the projector 102 and the camera 104, and thus needs no further calculation. Through the calculation described above, the position of each group of projected points in the captured image C is recalculated as a matching position in a subpixel unit.

In step S607, the symbol position calculation unit 108 determines whether the scanning on the reprojected point group H is completed, that is, whether the symbol position calculation has been performed on all the reprojected points h. When it is determined that the scanning is completed (Yes in S607), the symbol position calculation in step S306 is terminated. When it is determined that the scanning has not been completed (No in S607), the processing returns to step S602.

Through the processing described above, the symbol position U, as the set of the respective peak luminance positions u of the group of points forming the projection pattern E, can be calculated.

As described above, in the present exemplary embodiment, the captured image is evaluated, and the matching position is recalculated for each of the points forming the projection pattern in the area determined to be a highly accurate shape measurable area, based on the result of the window matching. More specifically, after the calculation performed by the matching calculation unit 105, recalculation is performed by the symbol position calculation unit 108. Thus, degradation of the measurement accuracy with the window matching can be suppressed. The three-dimensional shape is calculated for each of the three-dimensional points corresponding to the respective symbols. Thus, only small volume data involving no inaccurately complemented three-dimensional shapes at positions other than the symbol positions, can be output. Thus, the data volume and the calculation amount for the processing involving the three-dimensional shape can be reduced.

A second exemplary embodiment is described below. As the present exemplary embodiment, a specific exemplary embodiment will be described in which measurement accuracy information, which is useful when the three-dimensional measurement result is used, is further added to the processing in the first exemplary embodiment. In the first exemplary embodiment, highly accurate three-dimensional points are obtained in the areas in which highly accurate shape measurement can be performed, and thus the output result includes both inaccurate three-dimensional points and accurate three dimensional points. In the present exemplary embodiment, these three-dimensional points are not regarded as the same three-dimensional point in the output result, but are weighted with the measurement accuracy information indicating high accuracy and low accuracy.

Figure 9:
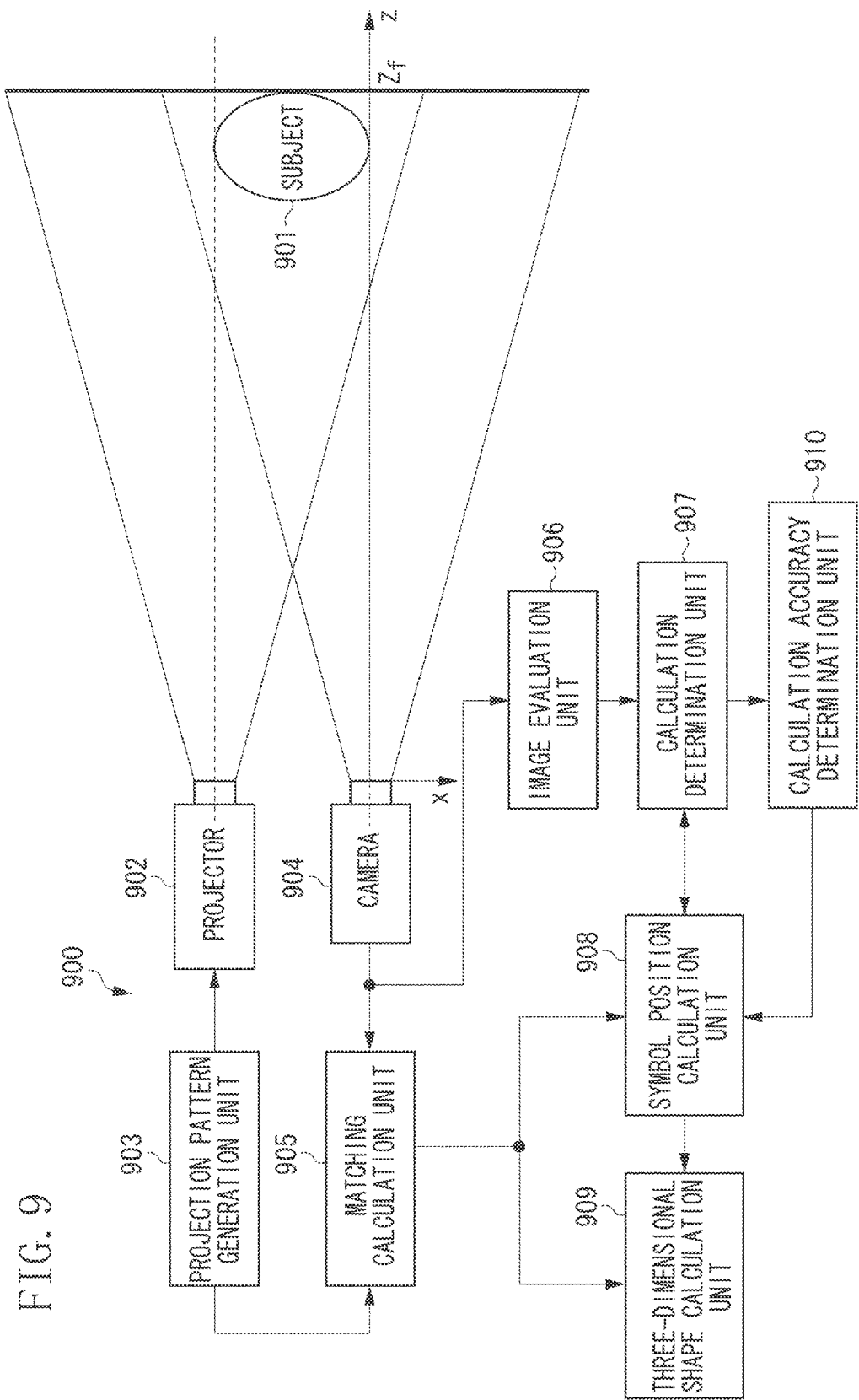
FIG. 9 is a block diagram illustrating an overall configuration example of an image processing apparatus according to a second exemplary embodiment.

FIG. 9 is a block diagram illustrating an overall configuration example of an image processing apparatus 900 for measuring a three-dimensional shape of a subject 901, according to the present exemplary embodiment.

In FIG. 9, components from a projector 902 to a three-dimensional shape calculation unit 909 according to the present exemplary embodiment respectively correspond to and have the same functions as the projector 102 to the three-dimensional shape calculation unit 109 in FIG. 1. Thus, a detail description of these components is omitted. A measurement accuracy determination unit 910 adds the measurement accuracy information for each of the symbols forming the projection pattern E, based on the value of the contrast image J obtained by the calculation determination unit 907.

Figure 10:
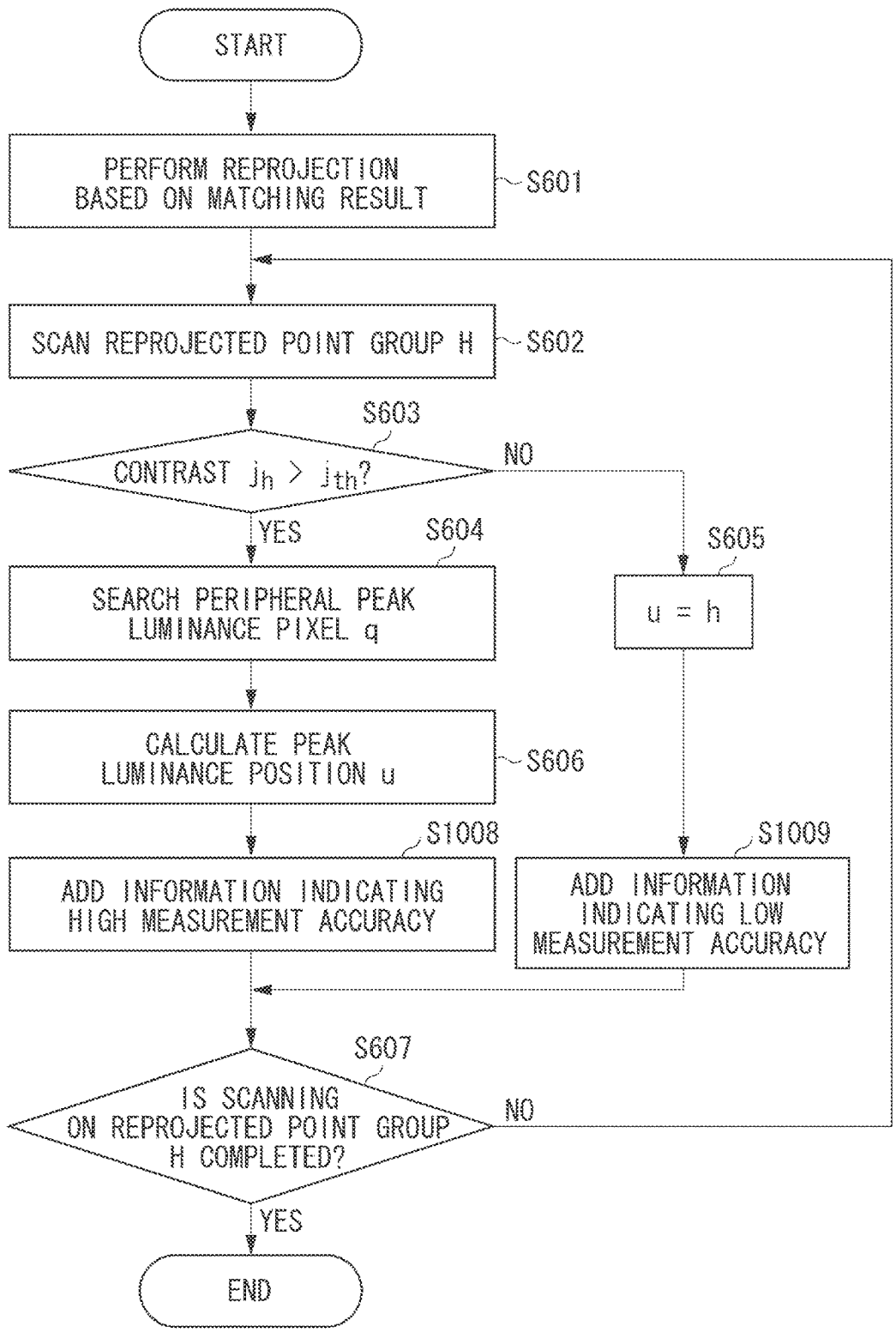
FIG. 10 is a flowchart illustrating an example of processing of calculating a symbol position of a group of points forming a projection pattern according to the second exemplary embodiment.

The overall processing executed in the present exemplary embodiment is basically the same as that in FIG. 3, except for the processing for calculating the symbol position in step S306. FIG. 10 is a flowchart illustrating in detail an example of processing in step S306 according to the present exemplary embodiment. The processing in steps in FIG. 10, except for the processing in step S601 to S607 that are the same as the counterparts in FIG. 6, will be described below.

In step S1008, the measurement accuracy determination unit 910 substitutes 1 indicating high accuracy into measurement accuracy information $v_p$ corresponding to the peak luminance position u.

In step S1009, the measurement accuracy determination unit 910 substitutes 0 indicating low accuracy into the measurement accuracy information $v_p$ corresponding to the peak luminance position u.

Through the processing described above, in step S306, the symbol position U and the measurement accuracy information $v_p$ corresponding to each symbol position can be calculated using the captured image C, the image of the projection pattern E, and the matching image D obtained in step S304.

As described above, in the present exemplary embodiment, the captured image C is evaluated, and the accuracy information indicating high accuracy can be added to the point in the projection pattern E corresponding to the position with the contrast higher than a predetermined value.

Furthermore, the accuracy information indicating low accuracy can be added to the point corresponding to the position with the contrast not higher than the predetermined value. Thus, for example, in performing three dimensional reconstruction using the output result, more accurate three dimensional reconstruction can be performed using the output result when weighting is set high to the three-dimensional point showing higher accuracy than when weighting set lower to the three-dimensional point showing low accuracy.

A third exemplary embodiment will be described below. As the present exemplary embodiment, a specific exemplary embodiment is described in which the symbol distance in the projection pattern is appropriately adjusted, in accordance with the projected state of the projection pattern, in addition to the processing in the first exemplary embodiment. When reflectance of the subject is low, the image of the projection pattern projected on the subject is captured with low brightness, thereby contrast in the captured image decreases. When the subject is extremely close to or far from the focal plane of the projector, the projected points forming the projection pattern extremely blur and overlap each other. Thus, due to the resultant low contrast of each point, the accuracy of the three dimensional measurement is degraded. In the present exemplary embodiment, when the contrast degradation is detected, the measurement accuracy can be prevented from degrading by resetting the distance between the points to become larger.

Figure 11:
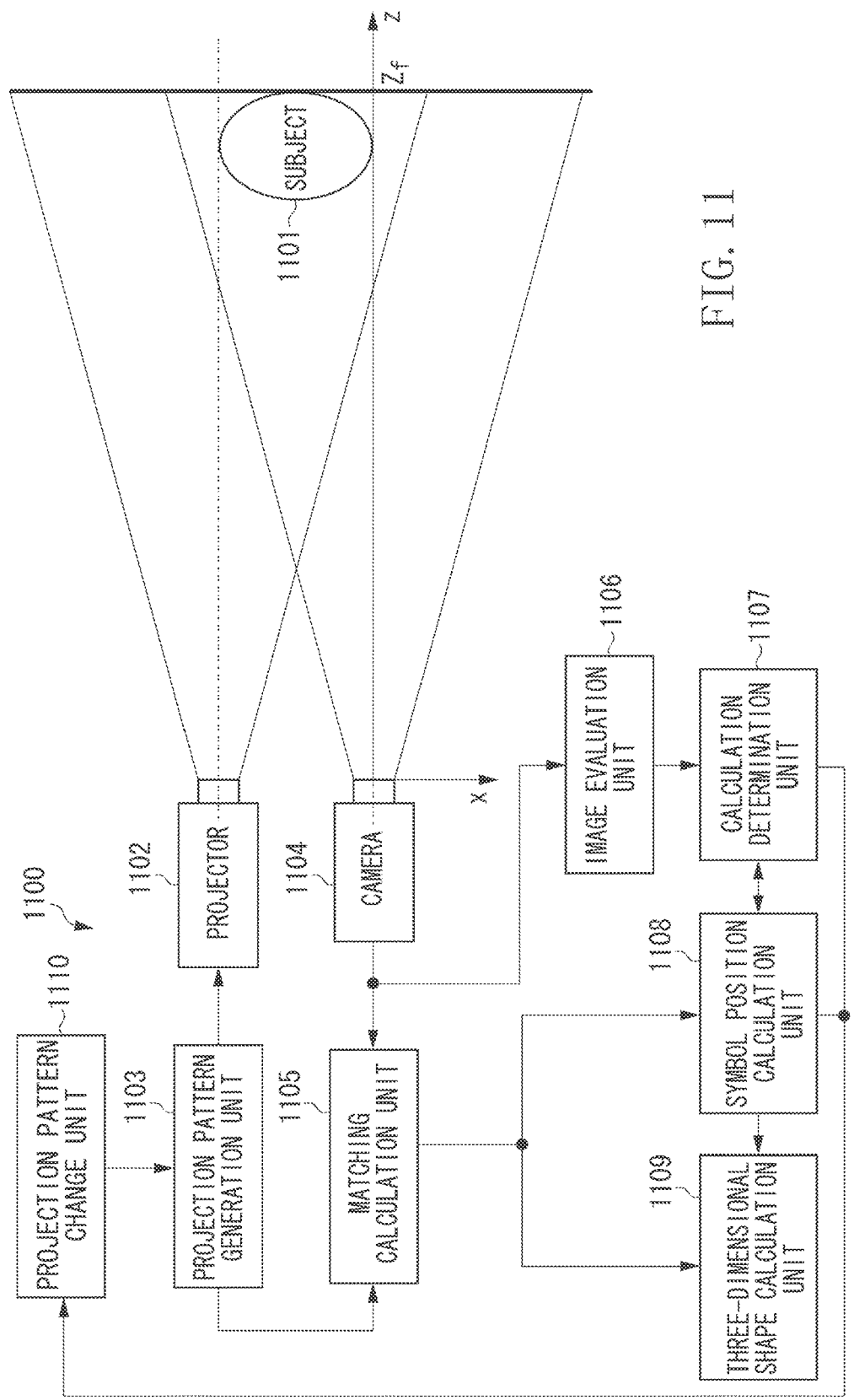
FIG. 11 is a block diagram illustrating an entire configuration example of an image processing apparatus according to a third exemplary embodiment.

FIG. 11 is a block diagram illustrating an entire configuration example of an image processing apparatus 1100 that measures the three-dimensional shape of a subject 1101 according to the present exemplary embodiment.

Components from a projector 1102 to a three-dimensional shape calculation unit 1109 in the present exemplary embodiment correspond to and have the same functions as the components from the projector 102 to the three-dimensional shape calculation unit 109 in FIG. 1. Thus, the description on the components is omitted. A projection pattern change unit 1110 adjusts a distance between symbols forming the projection pattern E, based on a result of determination by the calculation determination unit 1107 on whether the shape can be accurately measured.

Figure 12:
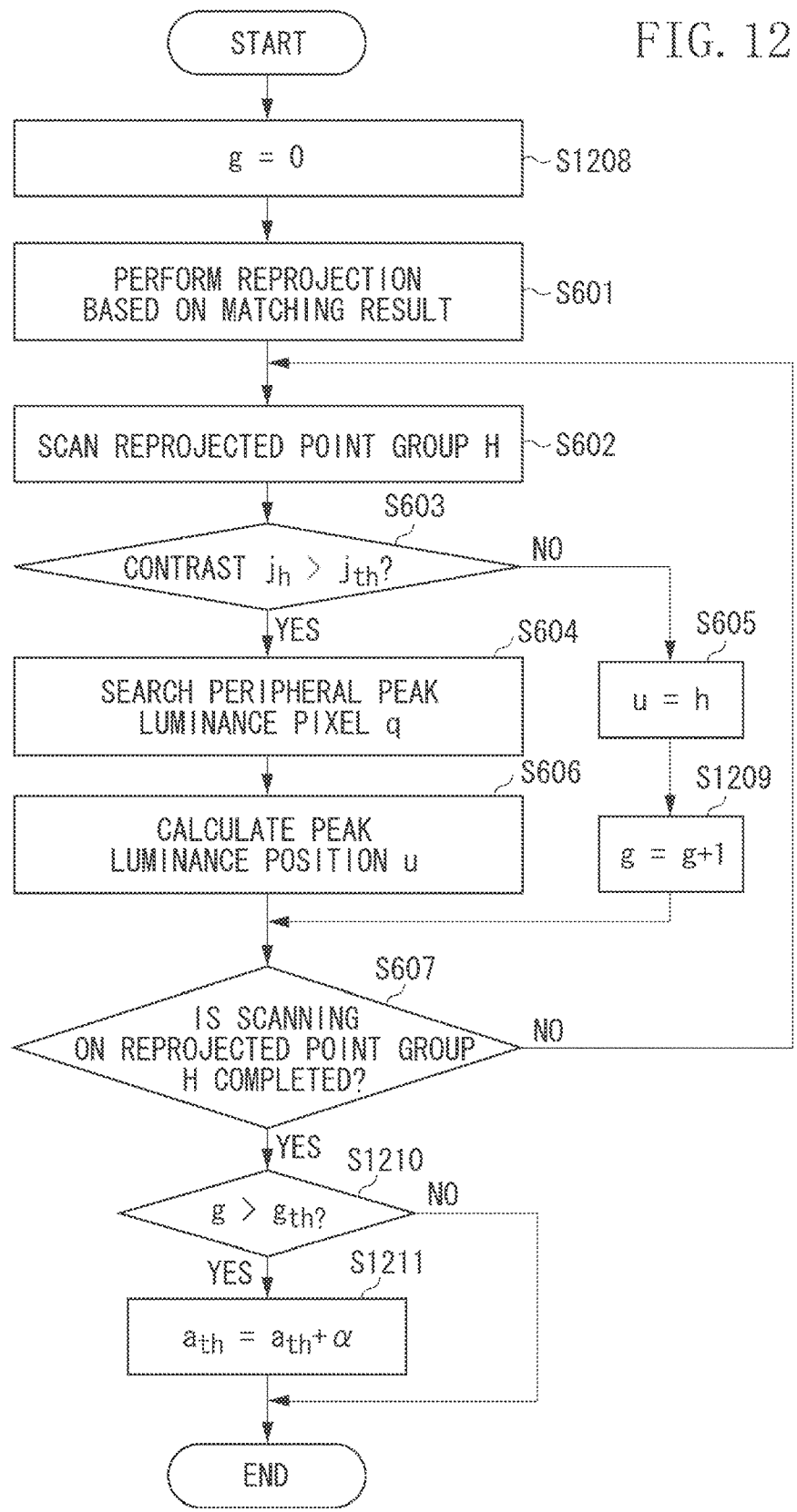
FIG. 12 is a flowchart illustrating an example of processing for calculating a symbol position of a group of points forming a projection pattern according to the third exemplary embodiment.

Overall processing in the present exemplary embodiment is basically the same with that in FIG. 3, except for the processing of calculating the symbol position in step S306. FIG. 12 is a flowchart illustrating an example of the processing in step S306 according to the present exemplary embodiment in detail. The processing in steps in FIG. 12, except for the processing in step S601 to S607 that are the same as in FIG. 6, will be described below.

In step S1208, the projection pattern change unit 1110 initializes the number g of inaccurate symbols indicating the number of symbol positions determined as having low accuracy, to zero.

In step S1209, the projection pattern change unit 1110 increments the number g of low accuracy symbols by one.

In step S1210, the projection pattern change unit 1110 compares the number g of low accuracy symbols with a predetermined threshold $g_{th}$ of the number of symbols. When the result of comparison indicates that the number g of low accurate symbols is larger than the predetermined threshold $g_{th}$ of the number of symbols (Yes in S1210), the projection pattern change unit 1110 determines that the distance between the symbols needs to be adjusted, and then the processing proceeds to step S1211. On the other hand, when the number g of low accuracy symbols is not larger than the predetermined threshold $g_{th}$ of the number of symbols (No in S1210), the processing in step S306 is terminated. The threshold $g_{th}$ of the number of symbols is set in advance in consideration of the balance between the measurement density that is prioritized when the threshold $g_{th}$ is high and, the measurable length range that is prioritized when the threshold $g_{th}$ is low.

In step S1211, the projection pattern change unit 1110 instructs the projection pattern generation unit 1103 to add a predetermined additional value α to the symbol distance threshold $a_{th}$. Thus, the symbol distance a becomes longer in the projection pattern E generated in the next measurement. Thus, the position of each point can be calculated even in a case where the subject 1101 is extremely far from the focal plane of the projector 1102 compared with the previous measurement. The predetermined additional value α is experimentally calculated and determined in advance so that the value α shows a length appropriate for the distance to the subject and change in the reflectance.

Through the processing described above, in step S306, the symbol position U as the set of peak luminance positions u of the group of points forming the projection pattern E is calculated based on the captured image C, the image of the projection pattern E, and the matching image D obtained in step S304. Furthermore, the projection pattern in which the symbol distance a is appropriately adjusted can be generated by evaluating the captured image C.

As described above, in the present exemplary embodiment, the number of three-dimensional points determined as having low accuracy is counted, whereby the contrast degradation, due to the blurring of the points forming the projection pattern or the overlapping between the projected points, is detected. When the contrast degradation is detected, the distance between the symbols in the projection pattern is appropriately adjusted, whereby the contrast degradation in the next measurement and thereafter can be prevented. Thus, even when the subject is closer to or far from the projection plane of the projector, for example, an accurate measurement can be achieved by repeating the measurement processing.

In the exemplary embodiments described above, the projection pattern E includes a group of circular points as the symbols. However, the exemplary embodiments are not limited to this. For example, the projection pattern may include rectangular or cross-shaped symbols, depending on the resolution of the captured image. By using such a symbol, the projection pattern can be favorably projected also when a projector that projects an arbitrary image including a group of rectangular pixels is used.

In the exemplary embodiments described above, the projection pattern E includes a group of points arranged in a random positional relationship. However, the exemplary embodiments are not limited to this. For example, a pseudo random positional relationship that can be generated through a predetermined calculation procedure may be employed instead of the random positional relationship. With the pseudo random positional relationship, stable matching performance can be achieved. Therefore, various three-dimensional shapes can be measured without much failure.

In the exemplary embodiments described above, the contrast is obtained through Formula (1). However, the exemplary embodiments are not limited to this. For example, a histogram may be generated by counting the number of pixels using each luminance value, and the contrast may be obtained from the ratio among the minimum luminance, the median luminance, and the maximum luminance in the histogram. Thus, the contrast can be favorably calculated in the case where noise in the captured image cannot be ignored, such as a case where the reflected light of the projector is small or the camera does not have a performance high enough to achieve a favorable signal-to-noise ratio.

Figure 13:
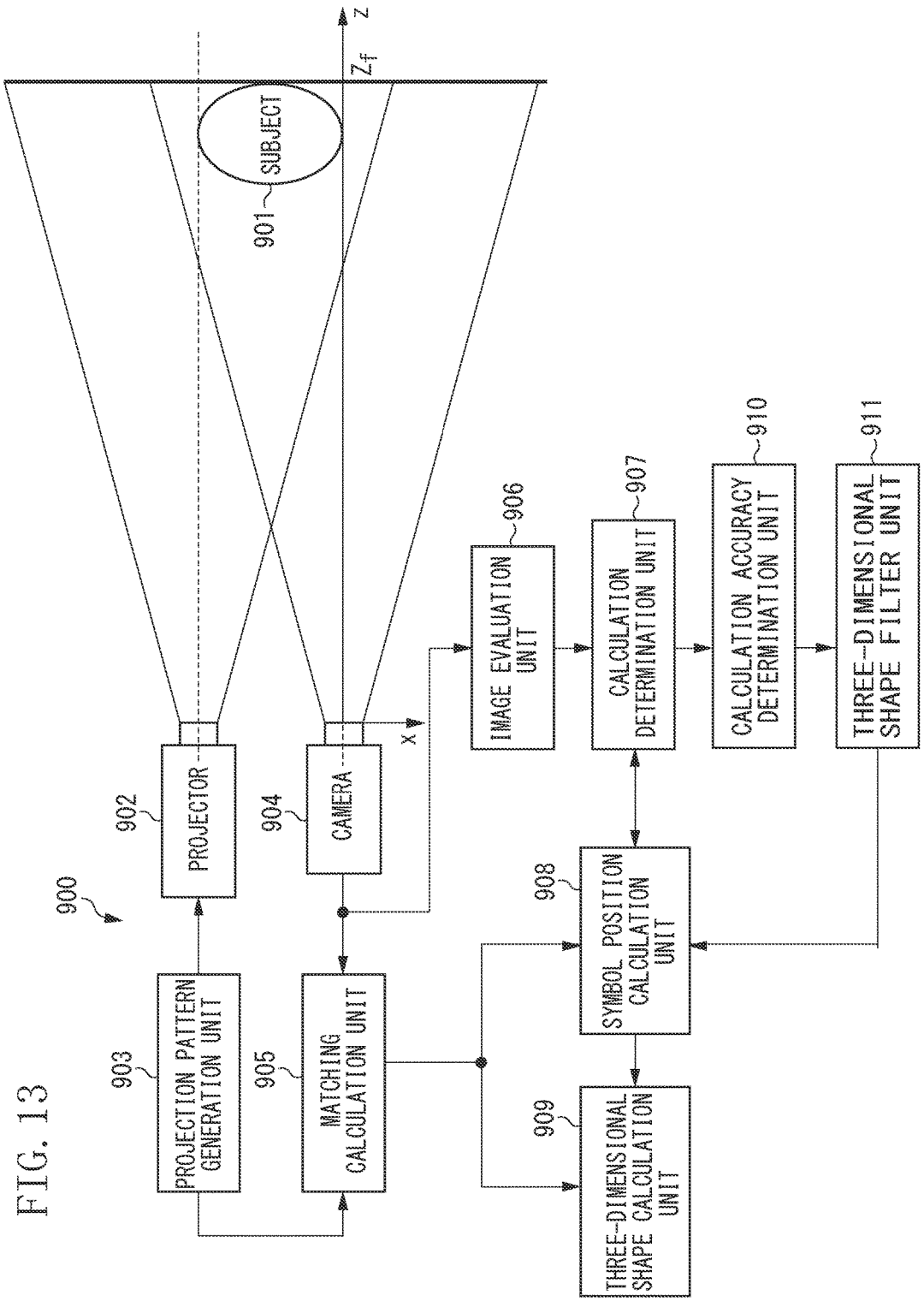
FIG. 13 is a block diagram illustration an overall configuration example of an image processing apparatus according to an exemplary embodiment.

The measurement accuracy determination unit 910 according to the second exemplary embodiment adds the measurement accuracy information. Furthermore, a three-dimensional shape filter unit 911 illustrated in FIG. 13 may be provided, so that the three-dimensional point to which the low accuracy information has been added is filtered out not to be output as the three-dimensional shape S. Thus, the three-dimensional shape more focused on the accuracy than the number of three-dimensional points can be obtained.

The present disclosure may be implemented by the following processing. More specifically, a program that implements one or more functions in the exemplary embodiments described above may be supplied to a system or an apparatus through a network or a storage medium, and one or more processors in the system or the apparatus may read and execute the program. Furthermore, the present disclosure may be implemented by a circuit (an application specific integrated circuit (ASIC), for example) that implements the one or more functions.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:
1. An image processing apparatus comprising:
a memory; and
a processor in communication with the memory, the processor configured to provide:
an image acquisition unit configured to acquire a projection pattern including a plurality of randomly arranged symbols, projected by a projection unit, and an image including a subject onto which the projection pattern is projected by the projection unit;
a first calculation unit configured to associate a first area in the projection pattern with a second area in the image;
a second calculation unit configured to calculate a pixel position of a symbol corresponding to a symbol in the first area, within the second area in the image, based on a calculation result obtained by the first calculation unit;

an evaluation unit configured to evaluate a contrast of the projection pattern in the image;

an accuracy determination unit configured to generate information indicating an accuracy of a calculation result obtained by the second calculation unit, based on an evaluation result obtained by the evaluation unit; and a measurement unit configured to measure a three-dimensional shape of the subject based on the position of the symbol calculated by the second calculation unit, wherein three-dimensional shape measurement accuracy is enhanced based on weighting settings indicating high accuracy and low accuracy.

2. The image processing apparatus according to claim 1, wherein the second calculation unit is configured to calculate depth information of the second area based on the calculation result of the first calculation unit, and calculate the position of the symbol in the second area by projecting the symbol in the first area onto the second area based on the depth information.

3. The image processing apparatus according to claim 1, wherein the evaluation unit is configured to evaluate each of the second area in the image, wherein when an evaluation value obtained by the evaluation unit, is higher than a predetermined value, the second calculation unit performs a calculation.

4. The image processing apparatus according to claim 3, wherein the evaluation unit is configured to evaluate the contrast of the projection pattern projected onto the subject in the image.

5. The image processing apparatus according to claim 1, wherein the processor is further configured to provide a three-dimensional shape filter unit configured selectively not to output information of the three-dimensional shape, based on the information generated by the accuracy determination unit.

6. The image processing apparatus according to claim 3, wherein the processor is further configured to provide a change unit configured to change a distance between the symbols in the projection pattern projected by the projection unit, based on an evaluation result obtained by the evaluation unit.

7. The image processing apparatus according to claim 1, wherein the projection pattern projected by the projection unit includes a group of points that are separated from each other by a predetermined distance or more.

8. The image processing apparatus according to claim 1, wherein, in the projection pattern projected by the projection unit, symbols are arranged in a random positional relationship or in a positional relationship calculated based on a predetermined calculation procedure.

9. The image processing apparatus according to claim 1, wherein the processor is further configured to provide:

the projection unit configured to project the projection pattern onto the subject; and an image capturing unit configured to capture the image of the subject onto which the projection pattern is projected by the projection unit.

10. An image processing method comprising:

acquiring a projection pattern including a plurality of randomly arranged symbols, and an image including a subject onto which the projection pattern is projected;

associating a first area in the projection pattern with a second area in the image;

calculating a pixel position of a symbol corresponding to a symbol in the first area, within the second area in the image, based on a calculation result obtained in the associating;

evaluating a contrast of the projection pattern in the image;

generating information indicating an accuracy of the calculating, based on an evaluation result obtained by the evaluating; and measuring a three-dimensional shape of the subject based on the position of the symbol calculated in the calculating, wherein three-dimensional shape measurement accuracy is enhanced based on weighting settings indicating high accuracy and low accuracy.

11. A non-transitory storage medium storing a program causing a computer to execute:

acquiring a projection pattern including a plurality of randomly arranged symbols, and an image including a subject onto which the projection pattern is projected;

associating a first area in the projection pattern with a second area in the image;

calculating a pixel position of a symbol corresponding to a symbol in the first area, within the second area in the image, based on a calculation result obtained in the associating;

evaluating a contrast of the projection pattern in the image;

generating information indicating an accuracy of the calculating, based on an evaluation result obtained by the evaluating; and measuring a three-dimensional shape of the subject based on the position of the symbol calculated in the calculating, wherein three-dimensional shape measurement accuracy is enhanced based on weighting settings indicating high accuracy and low accuracy.

12. The image processing apparatus according to claim 1, wherein the first calculation unit calculates a similarity between the first area and the second area and associates the first area with the second area based on the similarity.

13. The image processing apparatus according to claim 12, wherein the first calculation unit calculates the similarity based on a pixel value of each pixel in the first area and a pixel value of each pixel in the second area.

* * * * *